United States Patent
Pott

[19]

[11] Patent Number: 6,164,064
[45] Date of Patent: *Dec. 26, 2000

[54] METHOD AND ARRANGEMENT FOR DESULFURIZATION OF NOX RESERVOIR CATALYSTS

[75] Inventor: Ekkehard Pott, Gifhorn, Germany

[73] Assignee: Volkswagen AG, Wolfsburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/119,498

[22] Filed: Jul. 20, 1998

[30] Foreign Application Priority Data

Jul. 19, 1997 [DE] Germany ............................ 197 31 131
Jul. 19, 1997 [DE] Germany ............................ 197 33 129
Jul. 23, 1997 [DE] Germany ............................ 197 31 624

[51] Int. Cl.[7] ................................. F01N 3/00; F01N 7/00
[52] U.S. Cl. ................................. 60/277; 60/274; 60/285; 60/286; 60/295; 60/301; 60/278
[58] Field of Search ............................ 60/274, 268, 285, 60/295, 301, 278, 276, 286, 277

[56] References Cited

U.S. PATENT DOCUMENTS

| | | |
|---|---|---|
| 5,201,802 | 4/1993 | Hirota et al. .............................. 60/276 |
| 5,402,641 | 4/1995 | Katoh et al. .............................. 60/285 |
| 5,423,181 | 6/1995 | Katoh et al. . |
| 5,473,890 | 12/1995 | Takeshima et al. . |
| 5,655,363 | 8/1997 | Ito et al. .................................. 60/276 |
| 5,657,625 | 8/1997 | Koga et al. . |
| 5,724,808 | 3/1998 | Ito et al. .................................. 60/276 |
| 5,727,385 | 3/1998 | Hepburn .................................. 60/297 |

FOREIGN PATENT DOCUMENTS

| | | |
|---|---|---|
| 0761286 | 9/1996 | European Pat. Off. . |
| 0764771 | 9/1996 | European Pat. Off. . |
| 3009968 | 9/1980 | Germany . |
| 3810750 | 10/1988 | Germany . |
| 195 22 165 | 12/1995 | Germany . |
| 95/18292 | 7/1995 | WIPO . |

*Primary Examiner*—Jeanette Chapman
*Assistant Examiner*—Sneh Varma
*Attorney, Agent, or Firm*—Baker Botts L.L.P.

[57] ABSTRACT

By measuring the exhaust gas temperature with temperature sensors located immediately before and after an NOx reservoir in the exhaust gas line of an internal combustion engine, and by suitable control of rich-lean operation, an NOx reservoir catalyst can be heated above the desulfurization temperature. Immediately after desulfurization normal operation is restored in the case of a Diesel engine, whereas, in the case of an Otto engine, $\lambda=1$ operation is carried out briefly before returning to normal rich-lean operation.

13 Claims, 3 Drawing Sheets

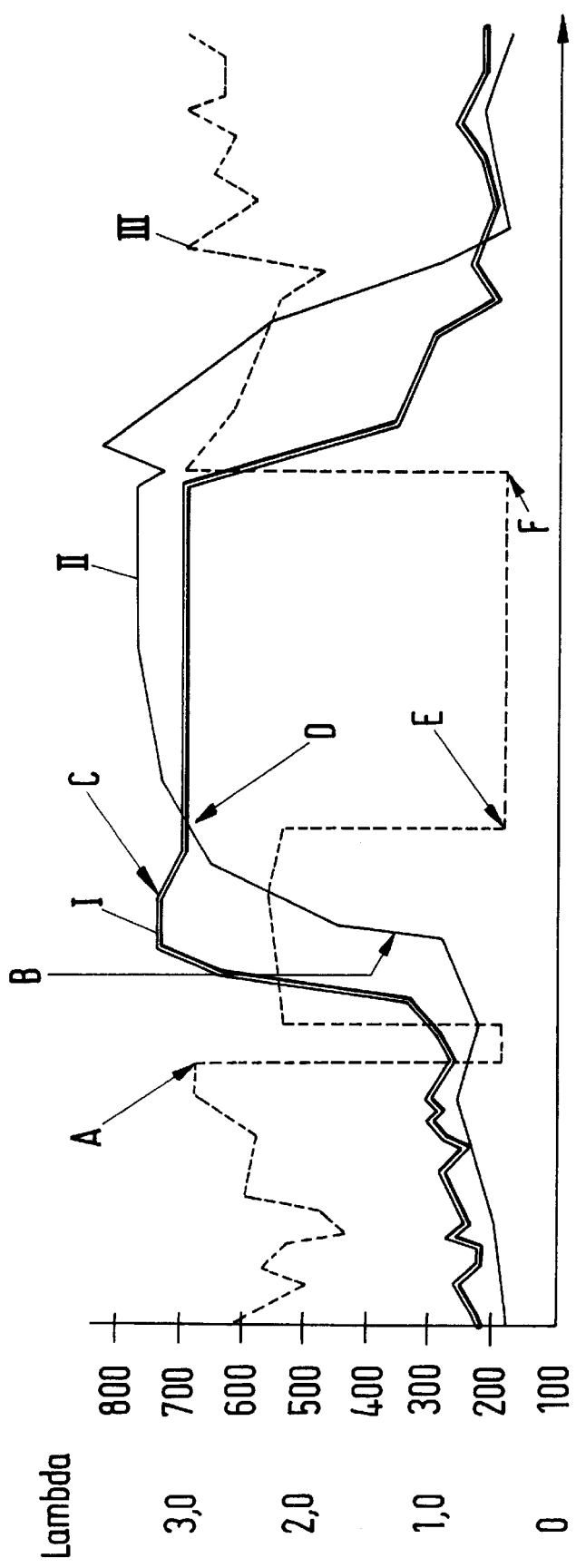

METHOD AND ARRANGEMENT FOR DESULFURIZATION OF NOX RESERVOIR CATALYSTS

BACKGROUND OF THE INVENTION

This invention relates to methods and arrangements for monitoring and controlling desulfurization of NOx reservoir catalysts in the exhaust of Otto or Diesel type internal combustion engines for exhaust gas purification.

NOx reservoir catalysts are poisoned during operation by sulfur contained in the fuel and incorporation of the sulfur as sulfate in the NOx reservoir catalyst, so that the NOx adsorption by the reservoir catalysts is impeded or prevented. Consequently a desulfurization of the NOx reservoir catalyst must be carried out at periodic intervals. It is known that sulfur poisoning of the NOx reservoir catalysts is largely or completely reversible, if the catalyst is subjected to a temperature above desulfurization temperature in a reducing environment. As used herein, the term "desulfurization" refers to the removal of sulfur in any form from a catalyst.

In the case of normally lean-operated Otto engines, it is possible to operate with a stoichiometric or a rich fuel-air mixture in any operating mode, at the expense of a corresponding increase in fuel consumption. By such measures as late ignition of the engine, moreover, the exhaust gas temperature is variable within wide limits, so that conventional desulfurization temperatures of about 650° can be achieved in practically any portion of the operating diagram of an Otto engine.

NOx reservoir catalysts can not incorporate any NOx under lean fuel conditions at temperatures above about 550°, and they also exhibit marked ageing effects when a temperature of about 800° is exceeded.

In the case of Diesel engines, useful operation at $\lambda \leq 1$ is not feasible because of the resulting power loss and increased particulate emission.

SUMMARY OF THE INVENTION

Accordingly, it is an object of the present invention to provide a method and arrangement for desulfurization of NOx reservoir catalysts which overcomes disadvantages of the prior act.

Another object of the invention is to provide a method for controlled desulfurization of NOx reservoir catalysts, and an arrangement for carrying out the method, which produces a regulated desulfurization in a simple manner without destruction of the NOx reservoir catalyst.

These and other objects of the invention are attained by causing the NOx reservoir catalyst to be heated to a temperature above the desulfurization temperature and operating the engine with a rich fuel-air mixture.

More particularly, the present invention effects desulfurization of an NOx reservoir by:

a) detecting a need for desulfurization of the NOx reservoir;

b) initiating and carrying out a procedure which increases exhaust gas temperature so that the NOx reservoir catalyst is heated above a predetermined desulfurization temperature;

c) desulfurizing the NOx reservoir by fuel-rich operation of the engine, and d) initiating a normal operation of the engine after completion of the desulfurizing step.

Moreover, the exhaust gas temperature-raising procedure is controlled so that the temperature of the NOx reservoir catalyst is always below the ageing temperature of the NOx reservoir catalyst. Preferably, the maximum NOx reservoir temperature is below the catalyst ageing temperature by a predetermined margin of safety.

In an internal combustion engine of the Otto type, the engine, upon detection of the need to desulfurize, is operated stoichiometricaly before any exhaust gas temperature-raising procedure is initiated. Thereafter, the exhaust gas temperature-raising procedure may be accomplished, for example by retarding the spark.

Preferably, in an internal combustion engine of the Otto type, immediately after the desulfurizing step, engine operation at $\lambda = 1$ is carried out before rich-lean operation of the engine is resumed but after a predetermined second margin of safety from the ageing threshold has been exceeded. Preferably, the second margin of safety is about 100 degrees Celsius.

Further, in the case of a Diesel type internal combustion engine, after recognition of a need to desulfurize, an NOx regeneration is first performed before any catalyst temperature-raising procedure is initiated. The NOx regeneration is performed by operation at $\lambda < 1$.

Preferably, the catalyst temperature-raising procedure used with Diesel engines is carried out by changing the time of commencement of injection, changing the EGR (exhaust gas return) rate, lowering the intake pressure, partial throttling, combined rich-lean operation, injection of fuel into the exhaust system ahead of the catalyst, or re-injection in the case of CR ("common rail") engines. Also, fuel enrichment may be achieved, for example, by intake air throttling and/or EGR increase and/or re-injection and/or pressure reduction.

For Diesel engines, normal engine operation is resumed immediately after termination of a desulfurizing.

The arrangement for carrying out the method according to the invention comprises an internal combustion engine having an NOx reservoir in the exhaust line and temperature sensors to measure the exhaust gas temperature both immediately before and immediately following the NOx reservoir.

BRIEF DESCRIPTION OF THE DRAWINGS

Further objects and advantages of the invention will be apparent from a reading of the following description in conjunction with the accompanying drawings, in which

FIG. 3. is a graphical representation schematically showing the desulfurizing process for a Diesel engine.

DESCRIPTION OF PREFERRED EMBODIMENTS

Figure 1:
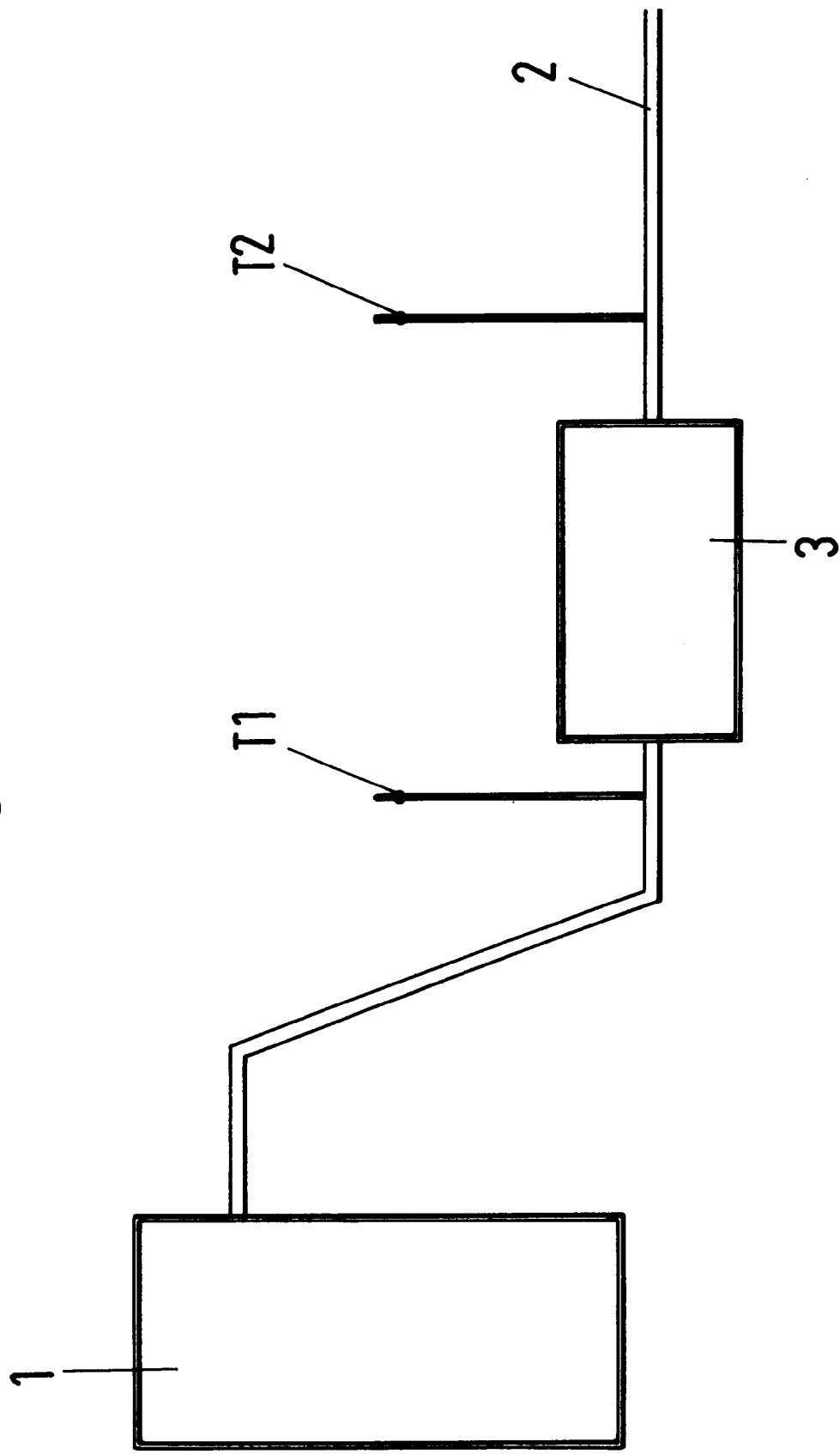
FIG. 1 is a schematic block diagram illustrating a representative embodiment of an arrangement for monitoring desulfurization, both for an Otto and for a Diesel engine.

In the typical embodiment of the invention schematically shown in FIG. 1, an arrangement for desulfurizing an NOx catalyst for an internal combustion engine includes an engine 1 and an exhaust system 2 having an NOx reservoir catalyst 3 and a first temperature sensor T1 located immediately before the NOx reservoir and a second temperature sensor T2 located immediately after the NOx reservoir 2. As shown in the drawing, the first temperature sensor T1 measures the exhaust gas temperature immediately ahead of the NOx reservoir 3, whereas the second temperature sensor T2 measures the exhaust gas temperature immediately following the NOx reservoir 3.

Figure 2:
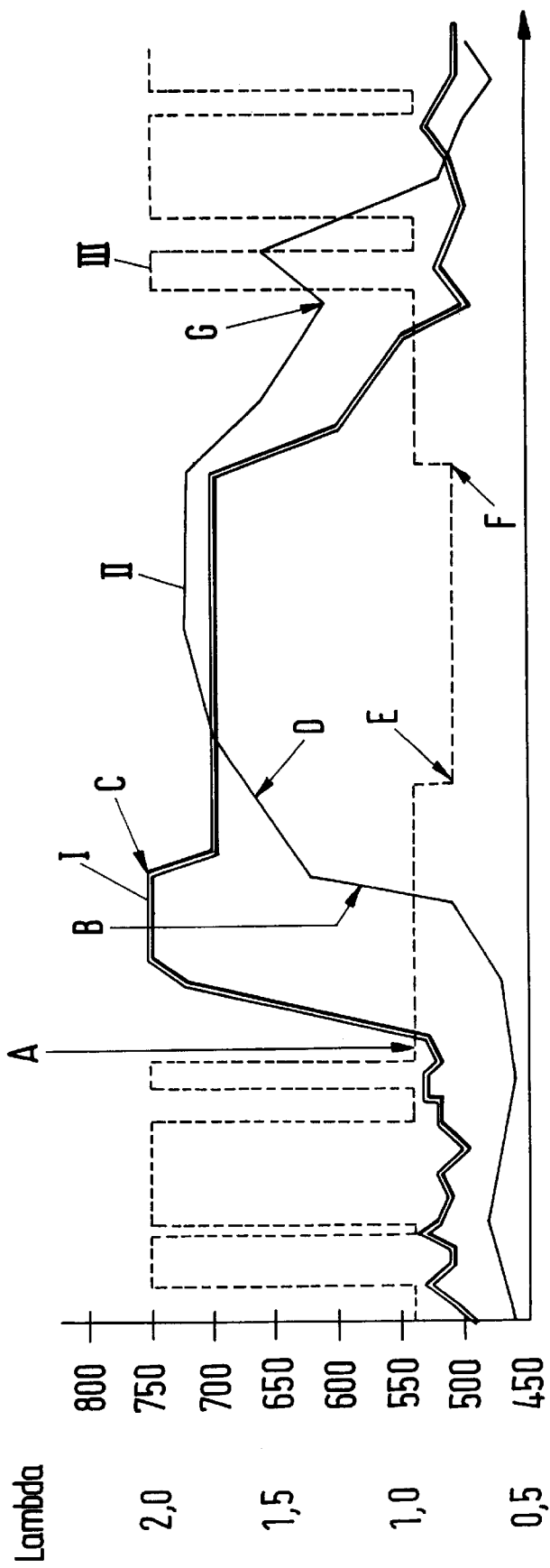
FIG. 2 is a graphical representation schematically illustrating the process of desulfurization for a lean Otto engine.

FIG. 2 schematically shows the variations in temperature and lambda with time during a desulfurization of the lean Otto engine 1. Thus, the curve I in FIG. 2 represents the temperature at the first temperature sensor T1, the curve II represents the temperature at the second temperature sensor T2, and the curve III illustrates the behavior of lambda.

When the need to desulfurize has been detected, the engine is first operated stoichiometricaly following the customary alternating rich-lean operation, and an exhaust gas temperature raising procedure. For example, late ignition is initiated (point A on curve III) until the sensor T1 ahead of the reservoir catalyst is at an elevated temperature below the catalyst ageing threshold, which is about 800° C. for current conventional NOx reservoir catalysts, by a margin of safety such as 50 degrees.

As a result of the increase in exhaust gas temperature and the possibly increasing content of contaminants in the exhaust, the temperature at the second temperature sensor T2 following the NOx reservoir catalyst also increases. If it is found that the catalytic reaction in the NOx reservoir catalyst causes the ageing threshold temperature to be exceeded, for example because of an excessive temperature rise at the point B of the curve I, the exhaust gas temperature-raising procedure is reduced as shown at the point C of curve I. The danger of internal overheating of the NOx reservoir 3 is probable if the rate of temperature increase in the neighborhood of the ageing threshold is so high that, even in the absence of the exhaust gas temperature-raising procedure, a temperature increase above the ageing threshold is to be anticipated.

If the desulfurizing temperature threshold is exceeded both before and after the NOx reservoir catalyst 3, as shown at the point D of curve II, the engine 1 is operated at a rich mixture (from the point E to the point F of curve III) until all of the sulfur content is sure to have been extracted. The duration and degree of rich fuel mixture operation will depend on the calculated or estimated content of sulfur on the catalyst. Immediately after the desulfurization (at the point F of curve III), lean operation of the engine 1 must be positively avoided since, because of the high catalyst temperature, no NOx can be incorporated and, with an HC- and CO-saturated exhaust, the addition of oxygen will certainly lead to elevation of the temperature above the ageing threshold in at least a portion of the reservoir catalyst 3. A more favorable mode of operation provides a brief period of further operation at λ=1, but without using an exhaust gas temperature-lowering procedure, to bring about a gradual lowering of the catalyst temperature.

After a large safety margin (about 100 degrees) from the ageing threshold temperature is exceeded (at point G of curve II), a rich-lean operation of the engine 1 is once more permissible. Thereafter, the NOx thermal desorption threshold may possibly be exceeded briefly in the NOx reservoir 3, but at the relatively low exhaust gas temperature of lean Otto engine vehicles, a rapid temperature increase above the NOx thermal desorption threshold is to be expected then.

FIG. 3 is a schematic diagram showing the desulfurization process for a Diesel engine 1. The designations of the curves I, II and III correspond to those of FIG. 2. In the case of Diesel engines, desulfurizing cannot be carried out in the same way as for lean Otto engines since operation at $\lambda \leq 1$ for any length of time is not possible because it reduces power and increases particulate emissions. Hence, upon detection of the need to desulfurize, an NOx regeneration is performed first so that increased catalyst heating, above the NOx thermal desorption threshold, will take place with the NOx reservoir 3 emptied. Then, with a lean exhaust, a catalyst temperature-raising procedure is carried out (point A of curve III), for example by re-setting the commencement of injection, changing the EGR rate, lowering the charge pressure, partial throttling, combined rich-lean operation, injection of fuel into the exhaust system ahead of the catalyst, or re-injection (in common rail engines only). The exhaust gas temperature of the sensor T1 ahead of the catalyst 3 is set so that the catalyst operates with a 50-degree margin of safety from the ageing threshold, much as for lean Otto engines.

By monitoring the exhaust gas temperature at the sensor T2 after the NOx reservoir 3, it is ascertained, as in the case of the Otto engine, that no overheating results from oxidation reactions on the NOx reservoir surface (point B of curve II). Thermal damage is avoided optionally by a partial reversal of the catalyst temperature-raising procedure (point C of curve I). As soon as the temperature at the sensor T2 following the catalyst has exceeded the desulfurization limit (point D of curve II), desulfurization is initiated by enriching the exhaust gas (point E of curve III). The duration of the exhaust gas and the value of λ during the enriched phase depend on the calculated or estimated load of sulfur in the catalyst. The enrichment can be accomplished similarly to NOx regeneration, for example by intake air throttling, EGR increase, re-injection or charge reduction.

After termination of the desulfurization (point F of curve III), operation at $\lambda \leq 1$ can no longer be sustained. Consequently, the normal mode of operation is immediately re-established. Because of the usually very low exhaust gas temperatures of Diesel engines and the resulting rapid and intense cooling, only a small temperature peak within the NOx reservoir is to be expected despite the oxidation reactions following desulfurization.

Although the invention has been described herein with reference to a specific embodiment many modifications and variations therein will readily occur to those skilled in the art. Accordingly, all such variations and modifications are included within the intended scope of the invention.

I claim:

1. A method for desulfurizing an NOx reservoir catalyst in the exhaust line of an internal combustion engine comprising the following steps:
   a) detecting a need for desulfurizing an NOx reservoir catalyst,
   b) initiating and carrying out an exhaust gas temperature-raising procedure whereby the NOx reservoir catalyst is heated to a temperature at least as high as a predetermined desulfurizing temperature and below a predetermined maximum NOx reservoir catalyst temperature;
   c) determining whether the ageing temperature of the NOx reservoir catalyst has been exceeded or the rate of temperature increase in the neighborhood of the ageing threshold is so high that a temperature increase above the ageing threshold can be anticipated and, if so, reducing the exhaust gas temperature-raising procedure;
   d) desulfurizing the NOx reservoir catalyst by rich operation of the engine; and
   e) restoring normal operation of the engine after completion of the desulfurizing step.

2. A method according to claim 1 including controlling the exhaust gas temperature-raising procedure so that the temperature of the NOx reservoir catalyst is always below the ageing temperature of the NOx reservoir.

3. A method according to claim 2 wherein the maximum NOx reservoir temperature is below the ageing temperature by a predetermined margin of safety.

4. A method according to claim 1 wherein the engine is an Otto type engine and wherein the engine is operated stoichiometrically after detection of the need for desulfurization before an exhaust gas temperature-raising procedure is initiated.

5. A method according to claim 4 wherein the exhaust gas temperature-raising procedure is carried out by retarding the point of ignition to a later time.

6. A method according to claim 1 wherein the engine is an Otto type engine and wherein, immediately after the desulfurizing step, operation at $\lambda=1$ is carried out and rich operation of the engine for desulfurization is resumed after the catalyst temperature has a predetermined second margin of safety from the ageing threshold temperature.

7. A method according to claim 6 wherein the second margin of safety is about 100 degrees Celsius.

8. A method according to claim 1 wherein the engine is a Diesel type engine and wherein, after detection of the need to desulfurize, an NOx regeneration is first performed and a catalyst temperature-raising procedure is initiated.

9. A method according to claim 8 wherein the NOx regeneration is performed by operation at $\lambda<1$.

10. A method according to claim 8 wherein the catalyst temperature raising procedure is carried out by at least one of the following steps: resetting the starting point of injection, changing of EGR rage, reducing charge pressure, partial throttling, combined rich-lean operation, injecting fuel into the exhaust system ahead of the catalyst, and re-injection in the case of CR engines.

11. A method according to claim 8 wherein rich operation of the engine is achieved by at least one of the following steps: throttling intake air, increasing EGR, re-injecting fuel, and lowering of charge pressure.

12. A method according to claim 8 wherein normal engine operation is resumed immediately after termination of desulfurization.

13. An arrangement for desulfurization of an NOx reservoir catalyst comprising an internal combustion engine, an exhaust line having an NOx reservoir catalyst, a first temperature sensor located in the exhaust line immediately ahead of the NOx reservoir catalyst and a second temperature sensor located immediately after the NOx reservoir catalyst to measure the temperature of the exhaust to facilitate desulfurization of the NOx reservoir catalyst, and means for controlling the operation of the internal combustion engine to increase the exhaust gas temperature and to determine whether the ageing temperature of the NOx reservoir catalyst has been exceeded or the rate of temperature increase in the neighborhood of the ageing threshold is so high that a temperature increase above the ageing threshold can be anticipated and, if so, to control the operation of the internal combustion engine to reduce the exhaust gas temperature to a level below the ageing temperature of the NOx reservoir catalyst.

* * * * *